United States Patent [19]

Engle

[11] Patent Number: 4,766,980
[45] Date of Patent: Aug. 30, 1988

[54] RAIL CAR BRAKE APPARATUS

[75] Inventor: Thomas H. Engle, Cape Vincent, N.Y.

[73] Assignee: General Signal Corporation, Stamford, Conn.

[21] Appl. No.: 99,610

[22] Filed: Jan. 21, 1987

Related U.S. Application Data

[62] Division of Ser. No. 776,762, Sep. 16, 1985, abandoned.

[51] Int. Cl.[4] .......................................... B61H 13/34
[52] U.S. Cl. .................................. 188/52; 188/206 R; 403/157; 403/161
[58] Field of Search ...................... 188/52, 53, 54, 55, 188/56, 49, 50, 51, 33, 207, 209, 212, 205 R, 206 R, 206 A; 403/155, 163, 157, 158, 161

[56] References Cited

U.S. PATENT DOCUMENTS

| | | | |
|---|---|---|---|
| 179,794 | 7/1876 | Hyde | 403/57 |
| 2,013,048 | 9/1935 | Hankins | 188/206 R |
| 2,409,908 | 10/1946 | Simpkins | 188/106 F X |
| 2,917,134 | 12/1959 | Buvelot | 188/52 X |
| 3,152,846 | 10/1964 | Dumpis | 403/158 X |
| 3,198,086 | 8/1965 | Rager et al. | 188/106 F X |
| 3,592,299 | 7/1971 | Erdmann | 188/196 F X |
| 3,595,348 | 7/1971 | Kyllonen | 188/203 |
| 3,675,944 | 7/1972 | Kobayashi | 403/163 X |
| 4,385,548 | 5/1983 | Persson et al. | 188/203 X |
| 4,389,135 | 6/1983 | Peters | 403/163 X |

Primary Examiner—George E. A. Halvosa
Attorney, Agent, or Firm—Robert R. Hubbard; Harold Huberfeld; Harold Wynn

[57] ABSTRACT

A parallel beam brake apparatus for dual and triple axle trucks and a single beam brake apparatus for single axle trucks each comprise spaced, pivotably mounted bell crank levers which engage a fluid operable actuator between one pair of arms and engage a pair of push rods with the remaining arms. Improved spherical joints between the arms and the push rods facilitate force tranmsmission without allowing push rod rotation. A unique pivot geometry between the bell crank levers and the brake beams facilitates assembly and improves stress distribution between the levers and the beams. The actuator includes a slack adjustor mechanism in which a spiral power spring unwinds to drive a lead screw and take up slack or is wound by the rotating, translating lead screw to add slack.

8 Claims, 7 Drawing Sheets

RAIL CAR BRAKE APPARATUS

This application is a division, of application Ser. No. 776,762 filed on Sept. 16, 1985, abandoned.

BACKGROUND AND SUMMARY OF THE INVENTION

The present invention relates in general to brake apparatus for use on rail cars. More particularly, the invention concerns an improved type of single cylinder, truck mounted brake apparatus, the cylinder comprising a slack adjuster.

Such single cylinder truck mounted brake apparatus have been in use for some time. For example, U.S. Pat. Nos. 3,780,837, to Haydu, and 4,060,152, to Bogenschutz et al, disclose rail car brake apparatus of this general type.

While such prior art brake apparatus have achieved a measure of success, various problems and drawbacks have been noted. In most cases, the prior art brake apparatus have been designed for use on either single axle or dual axle or triple axle trucks; so that, a given prior art brake apparatus typically cannot be readily removed from a rail car with one type of truck and installed on another with a different type of truck, without rather extensive modification.

Prior art apparatus of the type disclosed in the Haydu patent have also been criticized because of the rather large amount of pressurized fluid required to stroke their long-stroke actuators, especially those actuators having no provision for slack adjustment. Provision of long stroke capability is desirable to permit the use of thicker, longer lasting brake shoes. Where slack adjustment is provided, the prior art actuators frequently adjust only for increases in brake shoe clearance due to wear, but not for decreases in brake shoe clearance due to shoe or wheel replacement. Also, prior art slack adjusters do not begin to operate until the brake shoe engages the wheel. This delays the adjustment and possible unevenness in the brake application. Some adjusters require a number of brake application cycles before they are properly adjusted.

Another drawback of many prior art apparatus of this type has concerned the manual parking brake mechanism. Frequently, as in the older parallel beam systems, the parking brakes are applied by means of a linkage mounted on one side of the truck, to provide clearance with the central portions of the truck and bolster. Due to the off-center mounting of the parking brake linkage, the brakes tend to be applied first on the side nearer the linkage mount and then, if at all, on the side further from the linkage mount. Due to the point of force application, high stresses are induced in the beams, which must be of heavy construction. The off-center mounting also may result in application of insufficient braking force in cases where contact is made only on one side. Furthermore, crewmen checking a car to ensure parking brake application may mistakenly conclude that the brake has not been applied after looking at the shoes and wheels on the side opposite the linkage mount. In addition to the off-center mounting to clear the truck and bolster, large openings had to be cut in the bolster to allow assembly of the brake system and clearance for the cylinder and connecting rods. One prior art solution to these type of problems is disclosed by Bogenschutz et al.

Still another difficulty with such prior art apparatus has concerned the amount of disassembly required to remove and repair various elements of the apparatus. For example, it is sometimes not possible or is quite difficult to remove the actuator without disassembling a good portion of the rest of the brake apparatus.

A primary object of the present invention is to provide an improved brake apparatus or rigging for rail vehicles, the rigging being readily adaptable for use on vehicles having single, dual or triple axle trucks.

Another object of the invention is to provide an improved truck mounted brake apparatus having a fluid pressure actuated brake cylinder with a double-acting mechanical slack adjuster which automatically adjusts the clearance between the brake shoe and wheel to provide a constant clearance prior to each brake application, irrespective of brake shoe or wheel wear or replacement of shoes or wheels.

Still another object of the invention is to provide rapid take-up of the clearance after brake shoes have been replaced.

A further object of the invention is to provide a brake cylinder for such a brake apparatus, the cylinder being mounted to one of the brake beams and including means for manually stroking the actuator to apply parking brakes just as during normal application; whereby, uniform parking brake application is achieved at all wheels on both sides of the rail car truck.

Even another object of the invention is to provide a slack adjuster which permits "barring back" of the brake shoe manually to increase the shoe clearance.

Yet another object of the invention is to provide a parking brake operable by cables from a remote location to provide uniform parking brake application at all wheels.

Still another object of the invention is to provide a parallel beam brake apparatus having light weight channel-type brake beams and improved actuating and connecting linkages which minimize bending moments in the beams.

A still further object of the invention is to provide such a brake apparatus in which the light weight brake beams are attached to replaceable brake heads and in which improved spherical joints are used for connecting push rods to actuator bell crank levers.

An even further object of the invention is to provide a brake apparatus which optimizes the actuation angle of travel without modifying the truck bolster.

The above objects of the invention are intended to be only exemplary; so, other desirable objectives and advantages inherently achieved by the disclosed invention may occur or become apparent to those skilled in the art. Nonetheless, the scope of the invention is to be limited only by the appended claims.

The brake apparatus according to the invention is particularly adapted for use in rail vehicles having one, two or three transverse axles at each truck. At least one brake beam is mounted to each truck of the vehicle and extends in spaced, parallel relation to the axle for movement longitudinally of the vehicle. The brake beam includes at its opposite ends a pair of brake shoe carrying heads and each of the brake shoe carrying heads comprises a pivot means. A pair of bell crank levers is provided, each lever having a fulcrum and a pair of arms. One bell crank lever is mounted to each brake shoe carrying head with the fulcrum of the bell crank lever supported by the pivot means of the brake shoe carrying head. A fluid pressure operable brake cylinder is pivotably mounted at one end to one arm of one of the bell crank levers and at the other end to one arm of the other bell crank lever.

In such a brake rigging, one improvement of the invention comprises a pair of push rods each comprising at one end a clevis having a first axis of rotation, the clevis having arms with first bores spaced along this first axis. A spherical bearing member is positioned between the arms, the bearing member having a concave spherical bearing surface with a center of curvature positioned on the first axis. Means, such as a retaining pocket between the arms, are provided for holding the bearing member. The other arm of each of the bell crank levers has at its end a convex spherical bearing surface and a second bore having a second axis extending through the center of curvature of the convex spherical bearing surface. Means such as a pin or bolt extend through the first and second bores to pivotably couple the push rods to the bell crank levers with the spherical bearing surfaces in contact.

In accordance with another improvement of the invention, the pivot means formed in the brake shoe carrying heads comprises axially spaced bores having spaced, axially aligned and radially outwardly opening access slots. A transversely extending, outwardly opening space is defined between the axially spaced bores. The fulcrums formed in the bell crank levers include axially extending bosses or gudgeons sized to pass radially through the access slots so that the bell crank levers extend into the outwardly opening spaces and the bosses or gudgeons are positioned in the axially spaced bores. The bosses are provided with a common central bore. Bearing members rotatably support the bosses within the axially spaced bores and means such as a pin or bolt extend through the bearing members and the central bore to pivotably couple the bell crank levers to the brake shoe carrying heads. This allows positioning the pivot closer to the longitudinal center of the truck.

To provide additional support for the bell crank levers, the brake shoe carrying heads preferably comprise upwardly facing wear surfaces adjacent the lowermost of the axially spaced bores and the bell crank levers slide along these wear surfaces during brake applications and release. The other end of each push rod may be fixed to a parallel, secondary brake beam mounted adjacent a second axle in a dual or triple axle truck, or may be pivotably attached to a pull rod fixed to the same transverse axle.

The fluid pressure operable brake cylinder or actuator according to the invention comprises a housing having an interior bore within which a piston is mounted for reciprocating movement in response to pressurization and depressurization of a volume defined between the piston and the housing. A spring is positioned between the piston and the housing for biasing the piston toward a brakes-released position. A lead screw is rotatably and translatably supported at one end by the piston. Clutch means are operatively connected between the lead screw and the piston for selectively allowing or preventing rotation of the lead screw relative to to the piston. Means actuated by movement of the piston in the bore are provided for engaging the clutch means when the piston is in the brakes-released position and for releasing the clutch means as the piston moves between the brakes-released position and a brakes-applied position. The clutch means is also engaged in the brakes-applied position. A torsion power spring is operatively connected between the piston and the lead screw for rotating the lead screw or being wound by rotation of the lead screw when the clutch means is released; whereby, the lead screw is extended by the torsion spring means to take up slack, or retracted to wind the torsion spring means and provide slack, in an associated brake apparatus.

The clutch means preferably comprises a first pair of axially spaced clutch faces operatively connected to the piston, a clutch head mounted for rotation and axial translation within the piston, the lead screw being connected to the clutch head for rotation and translation therewith, and a second pair of axially spaced clutch faces operatively connected to the clutch head, the second pair being positioned between and juxtaposed to the first pair. The means for engaging, releasing and engaging the clutch means comprises a clutch operating lever pivoted to the piston, a clutch spring operatively associated with the clutch head, and a plunger slidably mounted in the piston in position to be pushed by the clutch operating lever when the lever contacts the housing. Movement of the plunger compresses the clutch spring and thereby releases one set of clutch faces from the brakes-applied position. Continued compression of the clutch spring subsequently engages the other set of clutch faces in the brakes-released position.

The lead screw is threaded through a nut, the nut being attached to a push rod slidably mounted in the housing for movement between the brakes-released and brakes-applied positions. As a result, force applied to the push rod in the brakes-released position causes the other set of clutch faces to disengage and thereby allows the lead screw to rotate through the nut and wind the torsion spring means.

In accordance with a further improvement of the invention, the actuator comprises a pair of telescope tubes attached to its piston and extending away from the volume defined between the piston and its housing. These tubes extend parallel to the lead screw of the actuator and a pair of hand brake actuator cables slidably extend into the housing and into respective ones of the telescope tubes. Means are operatively associated with the cables and the tubes for allowing the tubes to telescope over the cables when the piston moves in response to fluid pressure but for allowing the cables to move the piston toward the brakes-applied position in response to tension applied to the cables.

Other objects, advantages and novel features of tne present invention will become apparent from the following detailed description of the invention when considered in conjunction with the accompanying drawings.

DETAILED DESCRIPTION OF THE DRAWINGS

Figure 1:
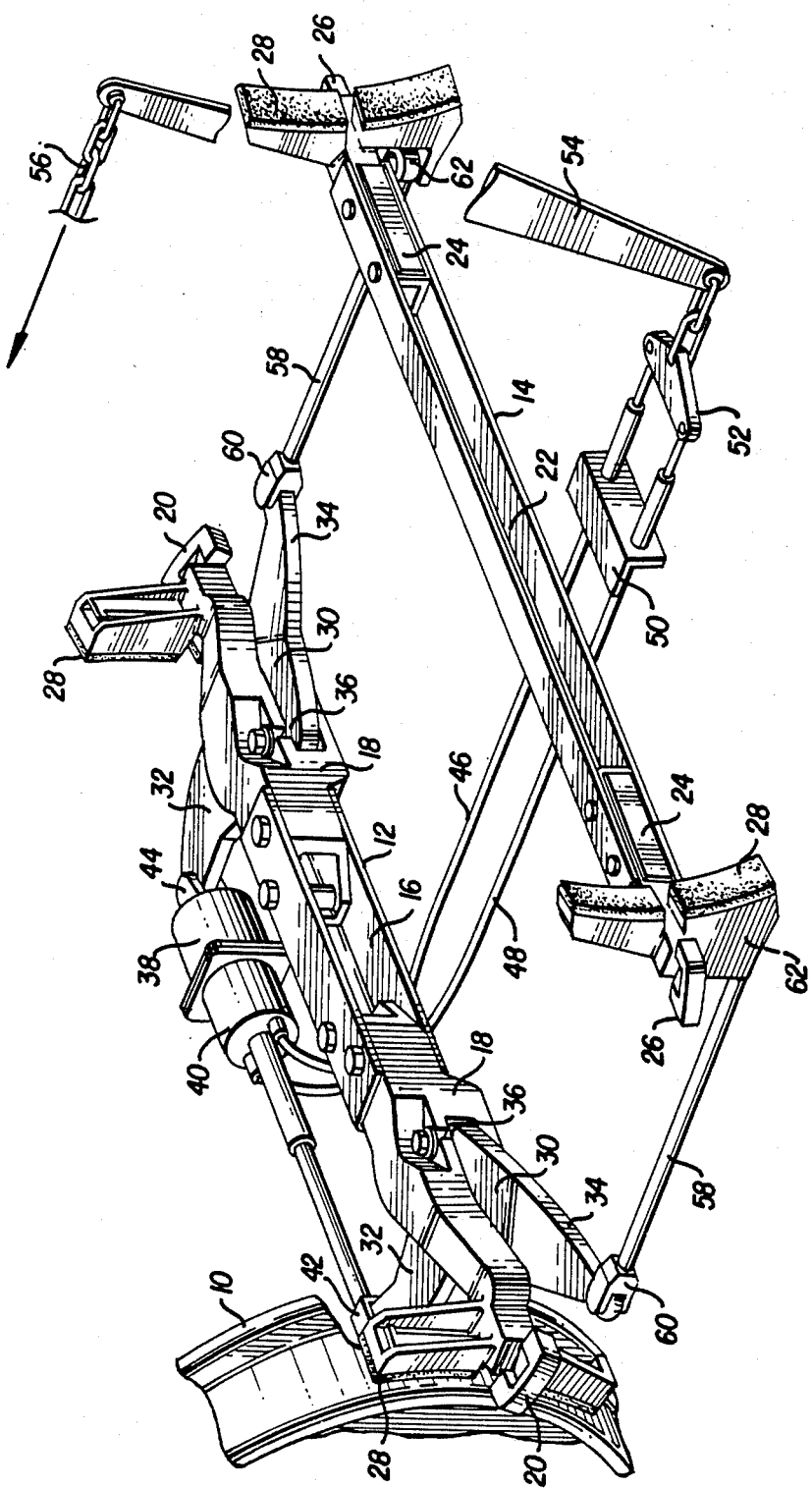
FIG. 1 is a perspective, partially fragmentary view of a parallel beam rail car brake apparatus embodying the improvements of the present invention, indicating the orientation of the various elements of the invention relative to the axle and wheels of such a rail car.
Figure 2:
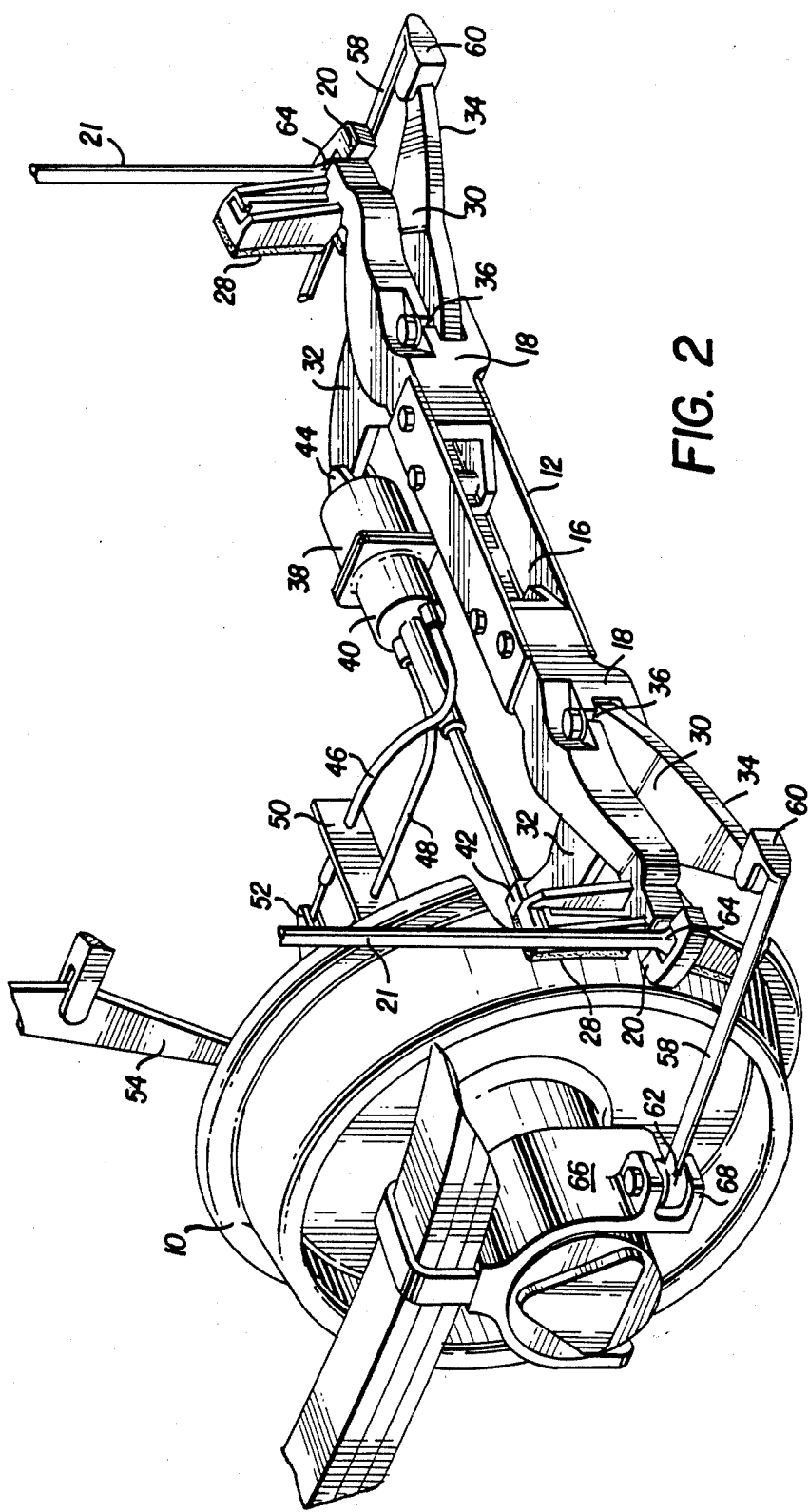
FIG. 2 is a perspective, partially fragmentary view of a single beam rail car brake apparatus for use on single axle trucks.

With reference to FIGS. 1 and 2, the overall geometry and operation of the brake apparatus according to the invention may be understood. FIG. 1 shows the arrangement used on a double axle truck and FIG. 2 shows the arrangement used on a single axle truck. A conventional rail car wheel and axle assembly 10 is illustrated fragmentarily. Located between and parallel with rail and axle assembly 10 and a similar assembly on the opposite side of the truck, not illustrated, are a primary or master beam 12 and a secondary beam 14. Beams 12 and 14 are movably mounted in conventional side frame members of the associated truck, not illustrated. Primary beam 12 comprises a central, rolled steel channel portion 16 having a pair of cast brake shoe carrying heads 18 hulk bolted thereto at either end. Brake heads 18 include integral, outwardly projecting guide feet 20 which are slidably received in slots located in the side frame members of the associated truck in the usual manner, as will be appreciated by those skilled in the art. Secondary beam 14 comprises a central, rolled steel channel portion 22 to which are attached cast brake shoe carrying heads 24 which are hulk bolted thereto at either end. Brake shoe carrying heads 24 also include outwardly projecting guide feet 26 which are likewise slidably received in the side frame members of the associated truck. Finally, conventional composition brake shoes 28 are attached to the brake shoe carrying heads 18, 24.

A pair of forged steel bell crank levers 30 are pivotably mounted to brake heads 18 of the primary beam 12. Each bell crank lever 30 includes a braking force receiving arm 32 which extends outwardly and upwardly on one side of the primary beam and a braking force transferring arm 34 which extends outwardly and downwardly on the other side of the primary beam. Between arms 32 and 34, each bell crank lever 30 comprises a pivot 36 about which the arms rotate when pivot 36 is mounted to the associated brake shoe carrying heads in the manner shown in FIG. 3. Arms 34 are sized to be as short as practical so that pivot 36 may be located as close as possible to the outboard ends of the master beam 12. This location of the pivots 36 ensures that the optimum force will be transferred from the actuator to the brake heads on both means while a minimum amount of bending stress will be generated in primary beam 12. The closer pivot points 36 are to the middle of primary beam 12, the greater are the bending stresses in use and the heavier must be the cross section of central channel portion 16.

A pneumatically operable brake cylinder 38, including a double acting slack adjuster 40, is pivotably connected to arms 32 at pivots 42 and 44. Additional details of brake cylinder 38 and slack adjuster 40 will be discussed with regard to FIGS. 7-9. A pair of armored cables 46 and 48 are provided for manually actuating brake cylinder 38. The ends of the sheaths of cables 46, 48 remote from actuator 38 are fixed to bracket 50 attached to the underside of the associated bolster or any other convenient location on the undercarriage of the car. The ends of the enclosed cables are pivotably attached to an evener bar 52 which in turn is linked to the lower end of an actuator lever 54 pivotably mounted to the car in the familiar manner. At the upper end of actuator lever 54, a chain 56 is attached which extends to a conventional hand brake actuator, not illustrated.

Figure 4:
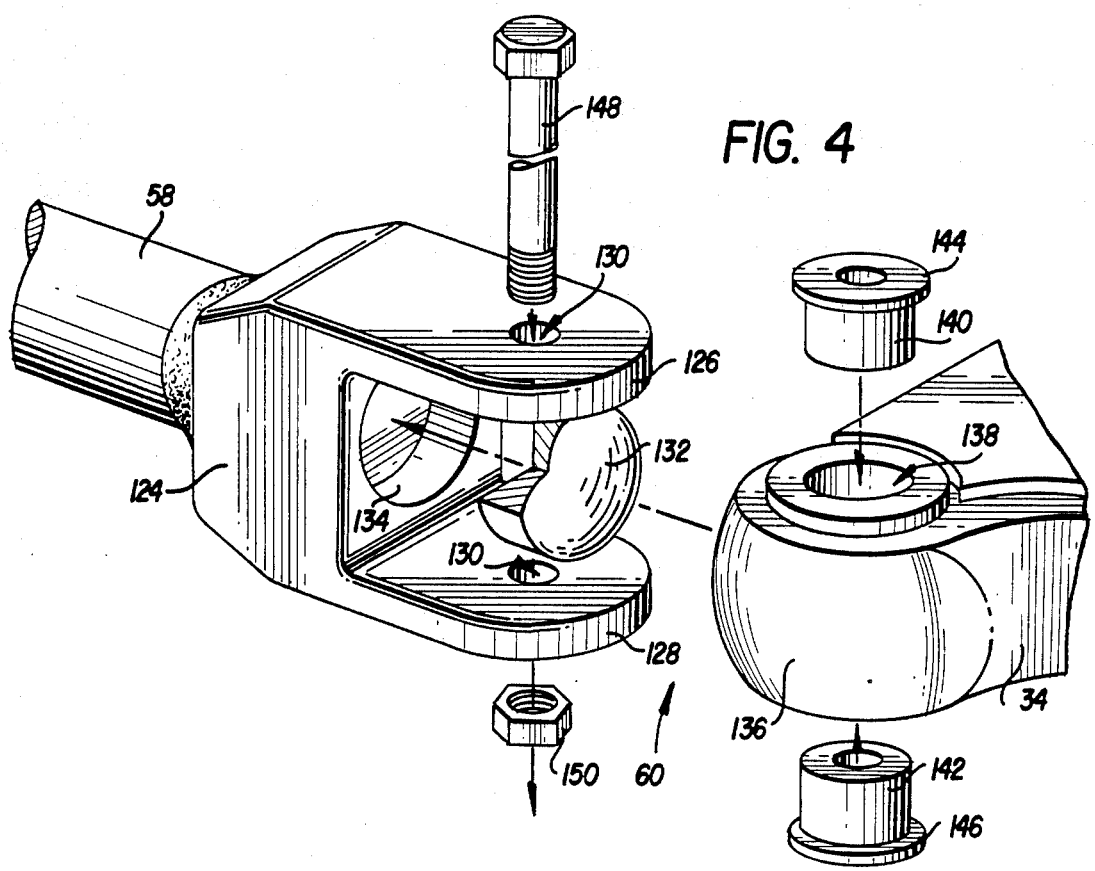
FIG. 4 shows a perspective, fragmentary view of the spherical bearing joint between one arm of the bell crank lever and the push rod of the brake apparatus.

A pair of push rods 58 are pivotably connected to arm 34 at spherical pivot joints 60, discussed in greater detail with respect to FIG. 4. The opposite ends of push rods 58 are joined to secondary beam 14 at pivot joints 62, illustrated in FIG. 5. Pivot joints 62 are located so that when the brakes are actuated, push rods 58 will assume a position virtually perpendicular to both primary beam 12 and secondary beam 14 to ensure transmission of optimum braking force to the rail car wheels. That is, spherical joint 60 is located slightly outboard of pivot joint 62 when the brakes are in their released position. Thus, as bell crank levers 30 rotate, push rods 58 tend to move to a position perpendicular to both brake beams.

During operation, pneumatic pressure is applied to brake cylinder 38, causing pivots 42 and 44 to move apart, rotating bell crank levers 30 about pivots 36. As the bell crank levers rotate, brake heads 28 mounted on secondary beam 14 will first move into contact with the adjacent wheels, due to force transmitted by push rods 58. After contact is established at these wheels, continued expansion of brake cylinder 38 will cause bell crank levers 30 to pivot about spherical joints 60 and thus move brake heads 28 of primary beam 12 into contact with the adjacent wheels 10. Thus, the braking force is applied equally at all wheels at both ends of each braking beam. During manual application of the brakes, brake cylinder 38 functions identically so that equal braking force is applied at all wheels during manual brake application as well.

The geometry of the brake rigging shown in FIG. 1 permits significant simplification of the brake beams. Because the push rods 58 join secondary beam 14 at pivot joints 62 located just inboard of brake heads 28, relatively low bending stresses are induced during operation. Also, axial loading of the bolted joint is minimized. As a result, central channel portion 22 may be relatively small in cross section. In addition, the design flexibility of a geometrically complex brake head is retained due to the use of cast brake shoe carrying heads, while the final beam assembly is simplified due to the use of simple bolted joints. Primary beam 12 is also simplified compared to prior art cast beams; however, the location of pivot points 36 on tne primary beam requires the use of a larger central channel portion 16. By making arms 34 as short as possible, consistent with a required movement of the brake heads 28 and the stroke capabilities of the actuator 38, the bending stress in the primary beam also may be minimized.

As will be explained more fully below with respect to FIG. 3, the structure of bell crank lever 30 and its mounting to primary beam 12 allows the pivot 36 to be closer to the longitudinal center of the truck and further away from the wheel 10. Bell crank lever 30 is configured to take advantage of this increased distance for greater pivotal motion. The bell crank arm 30 rotates from an oblique angle from the longitudinal axis, through 90° to an acute angle.

FIG. 2 shows a modification of the apparatus of FIG. 1 which is especially adapted for use with single axle trucks. In this case, the guide feet 20 are modified to accept a ball and socket joints 64 attached to lower ends of suspension links 21 pivotably attached to the undercarriage of the car in a manner not specifically illustrated. The push rods 58 extend in the opposite direction to that of FIG. 1 and are attached by means of a pivot joint 62 to a cast bearing adapter 66 mounted on the end of the axle assembly. Adapter 66 comprises integral mounting lugs 68 for attachment to pivot joint 62. In this embodiment, application of force to bell crank levers 30 causes the levers to pivot about spherical joints 60 so that the brake shoes are brought into contact with the associated wheels. Taking the reaction force of the beam in this way allows cancellation of the high brake shoe normal forces acting on the axle. Thus, braking causes no net longitudinal force at the axle and does not interfere with the ability of the axle to yaw or with curving of a single axle vehicle.

Figure 3:
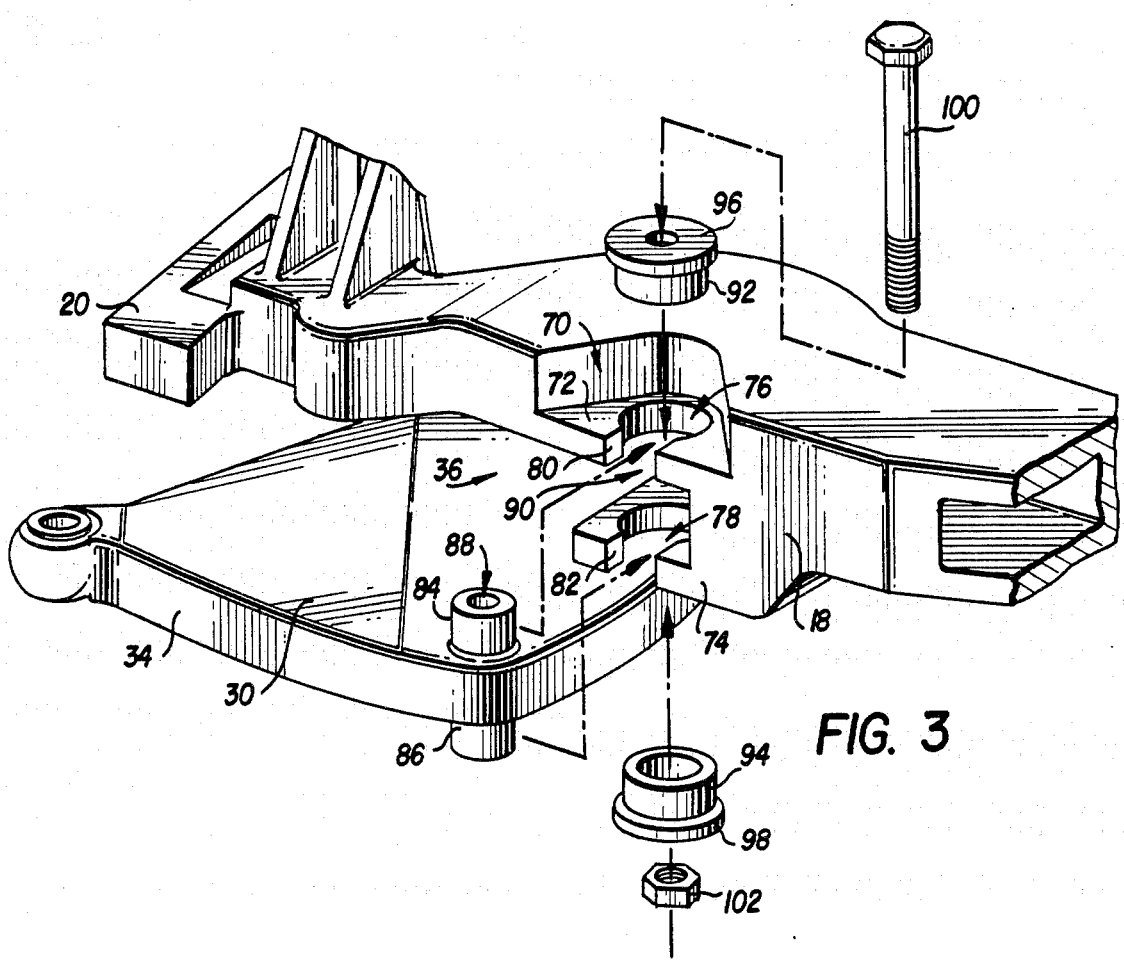
FIG. 3 shows a fragmentary, perspective view of a brake shoe carrying head and bell crank lever according to the invention, indicating the mode of pivotable connection between the trake shoe carrying head and the bell crank lever.

FIG. 3 shows a perspective, exploded view of the pivot joint between brake shoe carrying head 18 and bell crank lever 30. The brake shoe carrying head comprises, on its side facing away from the wheel assembly, an upwardly opening recess 70 which terminates at its lower end at a wall segment 72. On the underside of the brake shoe carrying head 18 a depending support flange 74 is provided. A pair of axially separated and aligned bores 76, 78 are provided through wall segment 72 and support flange 74. A pair of axially separated, aligned and radially outwardly opening access slots 80, 82 open from the exterior of the brake shoe carrying head into bores 76, 78 to define key holes. Each bell crank lever 30 comprises a pair of axially extending cylindrical bosses or gudgeons 84, 86 which are sized to be insertable into bores 76, 78 through access slots 80, 82. A central bore 88 extends through bosses 84, 86. When the bosses are inserted into bores 76, 78, the body of bell crank lever 30 is positioned within a space 90 defined between wall segment 72 and support flange 74. A pair of cylindrical brass bearing members 92, 94 fit between bosses 84, 86 and bores 76, 78 and are retained in position by radially extending support flanges 96, 98. The assembly of pivot 36 is completed by a fastener such as a bolt 100 and nut 102 which bear upon the outer surfaces of bearing members 92, 94. Due to the presence of bearing members 92, 94, the load on pivot 36 is not taken by bolt 100 but is transmitted directly to the bearing members and the body of the beam. Thus, the use of key hole bores is permissible since no force toward access slots 80, 82 is produced. This arrangement of the components of pivot 36 facilitates initial assembly of the primary beam and also facilitates removal of a bell crank lever from an installed brake rigging, if necessary.

FIG. 4 shows an exploded perspective view of spherical pivot joints 60. Each joint 60 comprises a clevis 124 attached to one end of push rod 58, the clevis having a pair of axially spaced arms 126, 128 through which central bores 130 extend to define an axis of rotation. A concave spherical bearing insert 132 is provided which has its center of curvature located on the axis of central bore 130. To retain bearing member 132, a retaining pocket 134 is provided between arms 126, 128. On the mating end of arm 34 of the associated bell crank lever 30, a convex spherical bearing surface 136 is provided surrounding a central bore 138 whose axis coincides with the center of curvature of bearing surface 136. A pair of brass bearing members 140, 142 having radially extending retention flanges 144, 146 are fitted within central bore 138. When convex bearing surface 136 is placed in engagement with concave bearing surface 132, a bolt 148 is passed through central bore 130 and bearing members 140, 142 and is secured by means of a nut 150 to complete the joint. The fastening of the clevis 124 through the center of curvature of the spherical joint, as shown in FIG. 4, serves to prevent the push rod 58 from rotating, thus assuring that the length adjustment of the push rod 58 at the secondary beam cannot change once the push rod has been installed.

Figure 5:
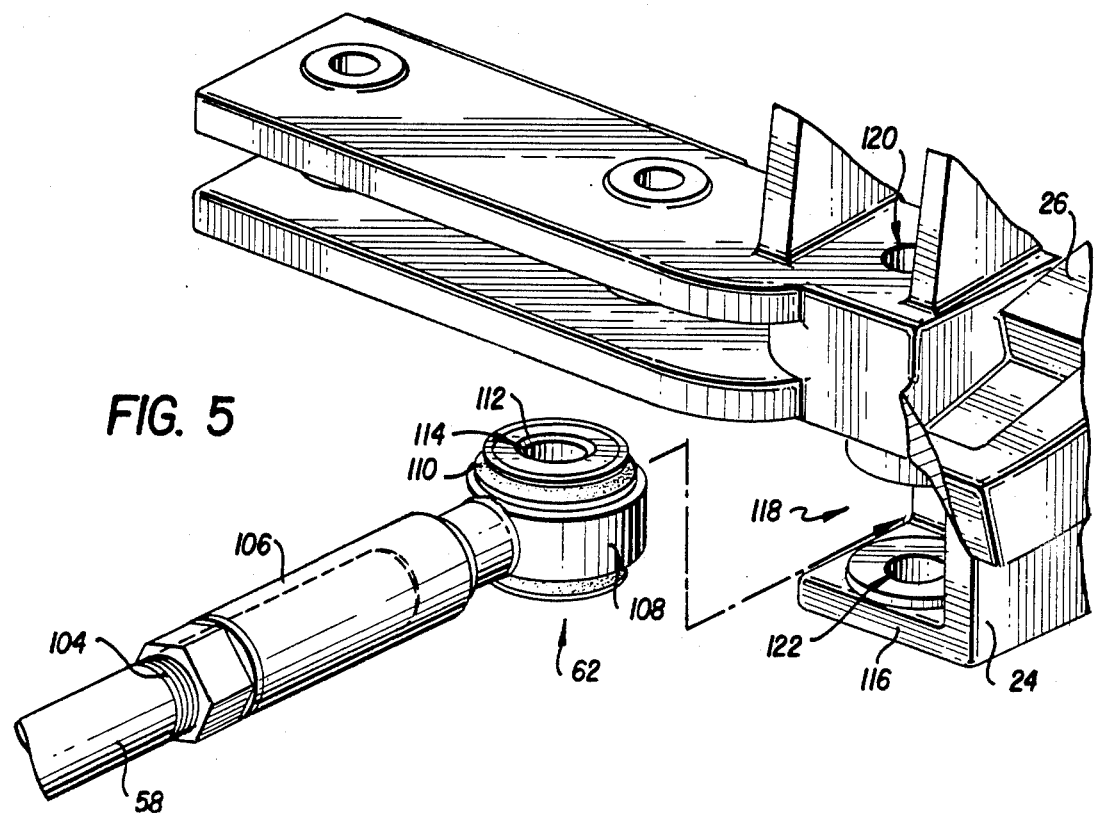
FIG. 5 shows a perspective, partially fragmentary view of the pivotable joint between a push rod and brake shoe carrying shoe carrying head of the secondary brake beam shown in FIG. 1.

FIG. 5 shows a perspective, exploded view of a pivot joint 62 at the secondary beam in FIG. 1 or between the push rod and the bearing adapter 66 in the embodiment of FIG. 2. Push rod 58 comprises a threaded end 104 which is threaded into a rod end sleeve 106 having an associated lock nut thereby permitting adjustment of the effective length of push rod 58. Attached to the end of sleeve 106 is an annular bushing support 108 within which is bonded a rubber vibration damping bushing 110 having a central metal sleeve 112 with a central bore 114. The brake shoe carrying head 24 of the secondary beams is provided with a depending flange 116 so that a rod end pocket 118 is defined. In FIG. 2, the pocket is defined between lugs 68. A through bore 120 in the body of brake shoe carrying head 24 and a further through bore 122 in depending flange 116 are sized to pass a suitable pin or bolt, not illustrated, which secures pivot joint 62. A similar arrangement is used between joint 62 and clevis 68 in the embodiment of FIG. 2.

Figure 6:
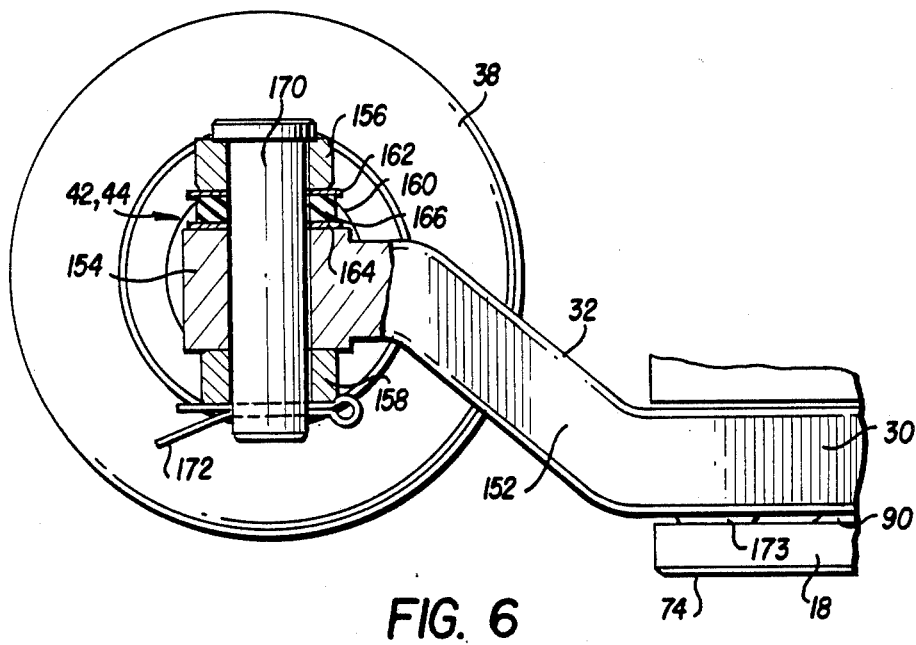
FIG. 6 shows an elevation, partially sectioned and fragmentary view of the pivotable joint between the bell crank levers and the fluid operable actuator according to the invention.
Figure 7:
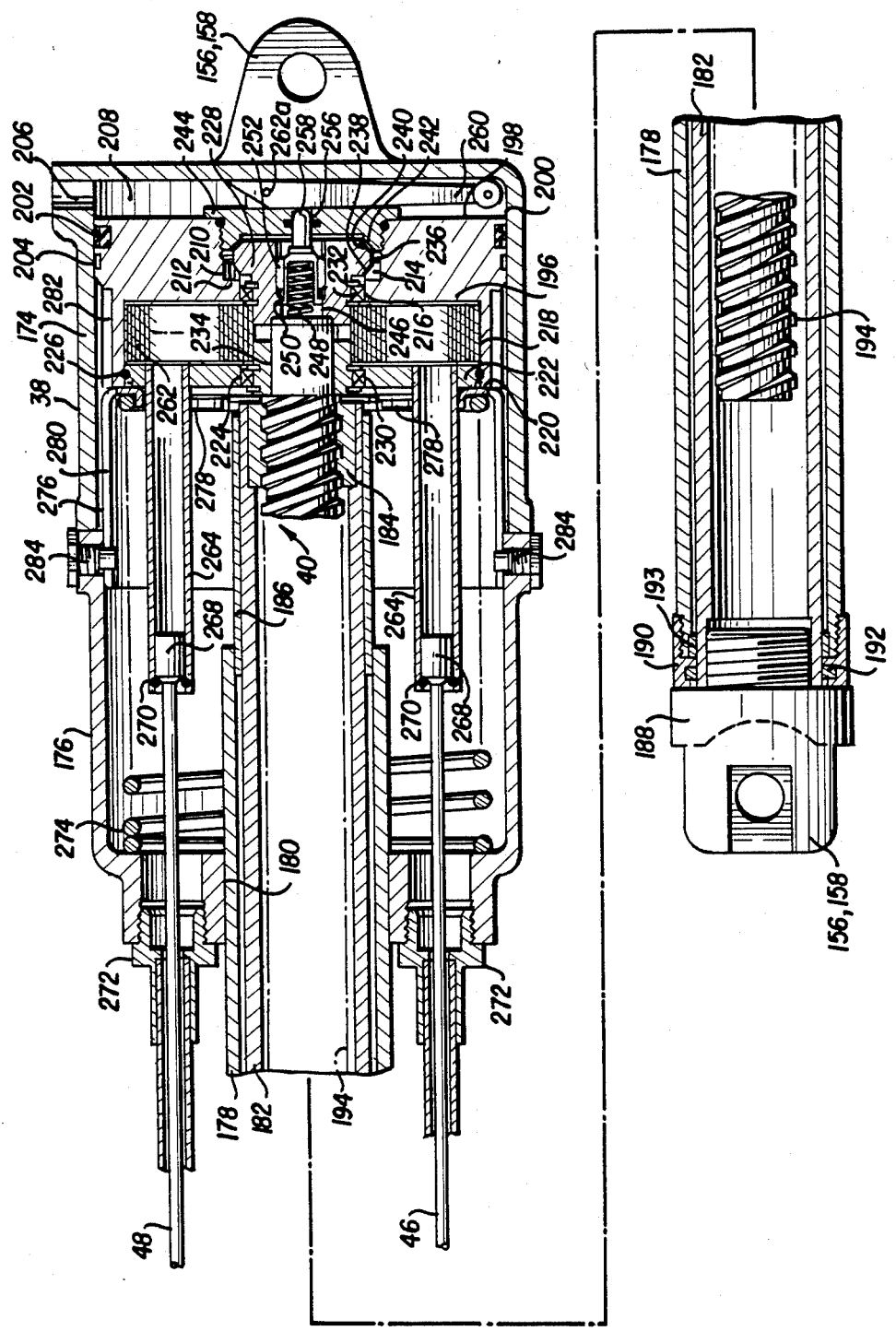
FIG. 7 shows an elevation view, partially in section, of a fluid operable actuator according to the invention, indicating the relative position of the components of the device in the brakes-released position.
Figure 8:
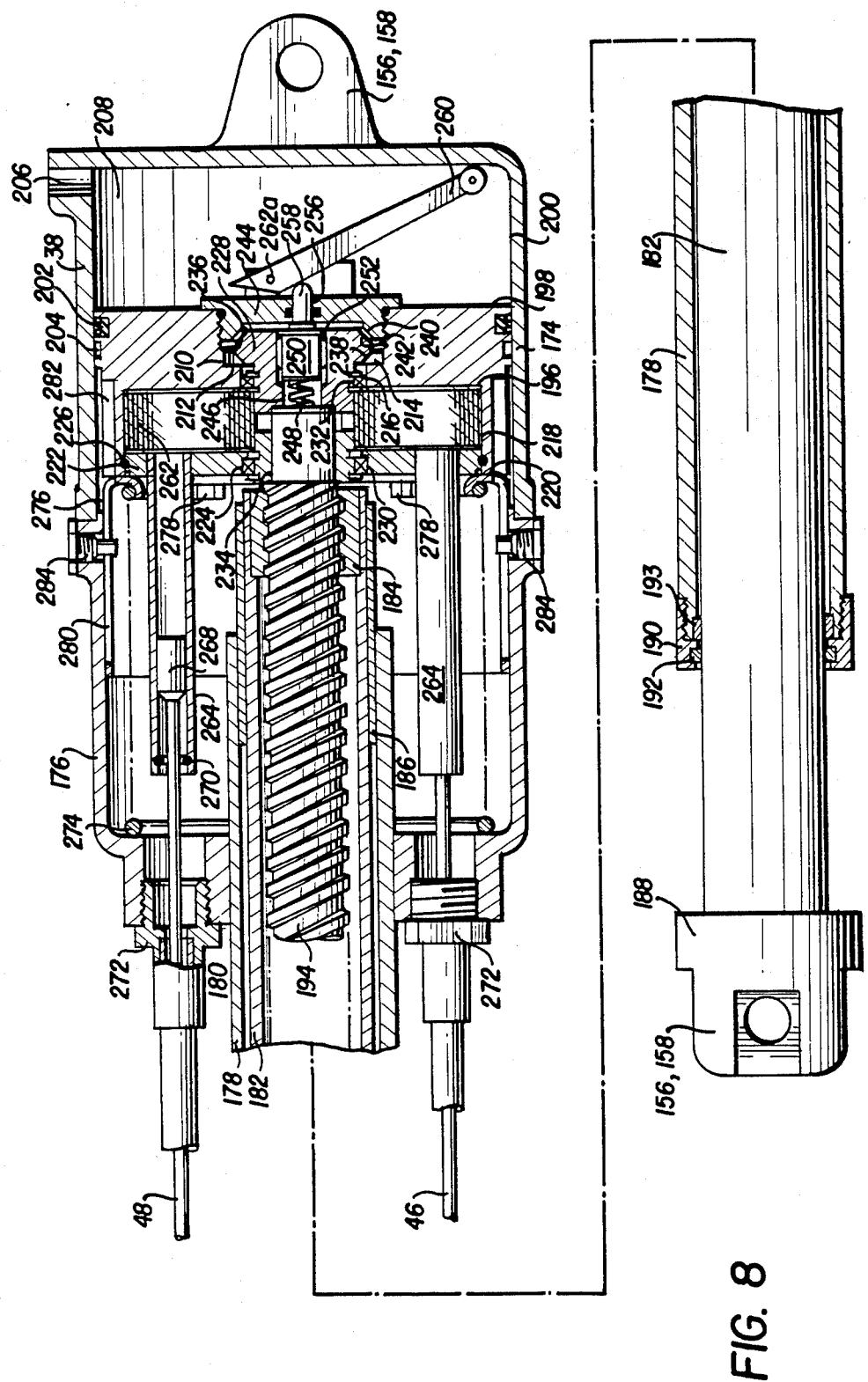
FIG. 8 shows the actuator of FIG. 7 when the piston has moved to the left in response to fluid pressure, just prior to release of the clutch to allow rotation of the lead screw by the torsion spring.
Figure 9:
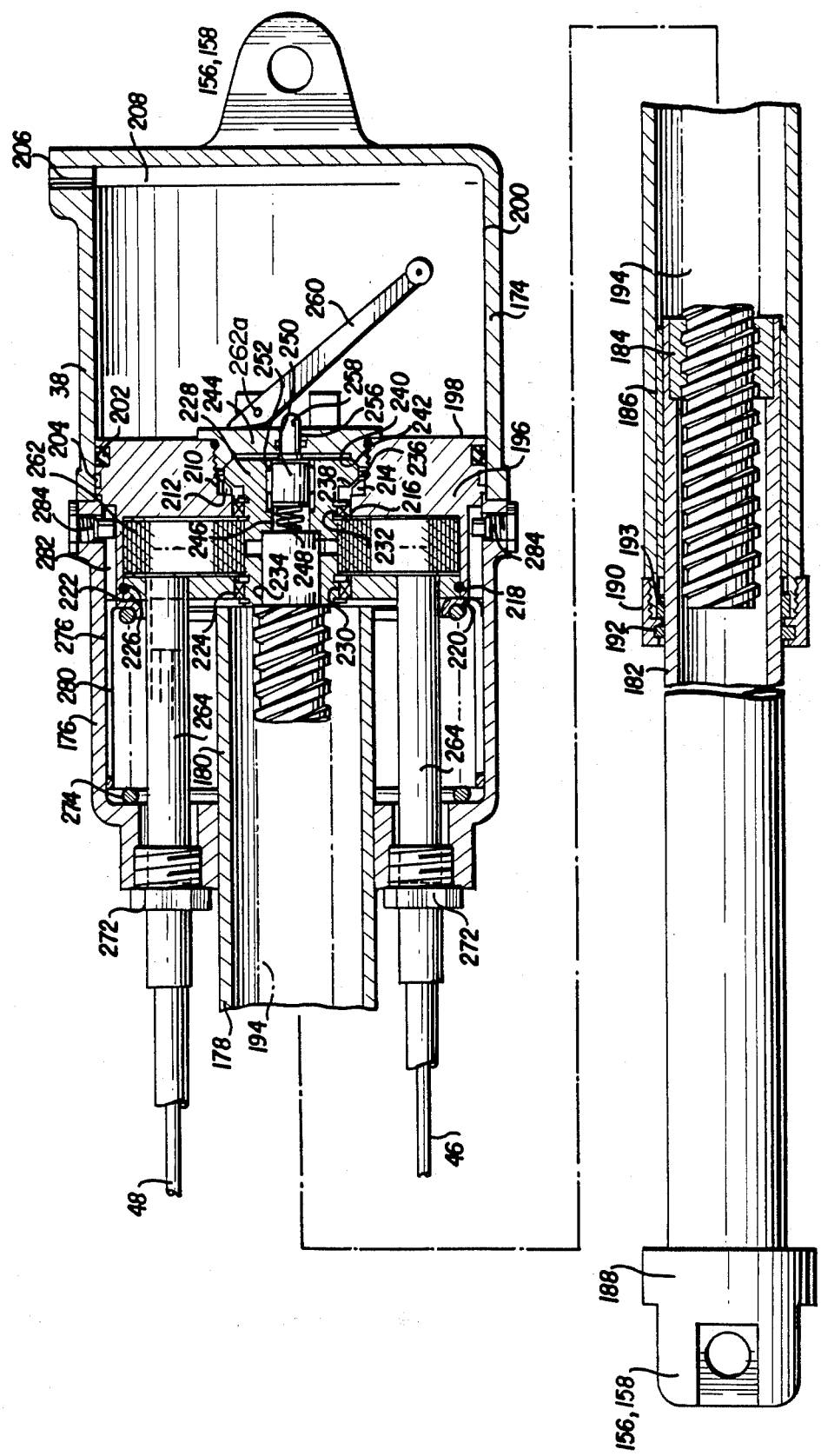
FIG. 9 shows a view of the apparatus of FIGS. 7 and 8 when the actuator has been extended to the brakes-applied position.

FIG. 6 shows a fragmentary elevation view through pivot joints 42, 44. As shown in the Figure, brake force receiving arm 32 comprises an upwardly angled portion 152 which permits the brake actuator 38 to be positioned at a relatively higher location behind the bolster than was achievable with the brake apparatus disclosed by Bogenschutz et al. Arm 32 terminates in an essentialy horizontally extending boss 154 which fits between a pair of attachment lugs 156, 158 provided at either end of the actuator 38, as shown in FIGS. 7-9. A vibration damping washer 160 is positioned between boss 154 and lugs 156, 158. Preferably, washer 160 comprises a pair of metal washers 162, 164 between which is bonded a rubber washer 166. Means such as a pin 170 extend through washer 160 and bores provided through lugs 156, 158. A retainer such as a cotter key 172 may be used to retain pin 170. An upwardly facing wear surface 173 is provided on the upper surface of flange 74, to support bell crank lever 30 as it rotates.

FIG. 7 shows an elevation view, partially in section, of a brake actuator 38 having a slack adjuster 40 in accordance with the present invention. The actuator is shown in the brakes-released position. A hollow cylinder bottom 174 is attached by suitable means such bolts, not illustrated, to a hollow cylinder top 176. An actuator guide tube 178 extends into cylinder top 176 via a bore 180 in the end wall of cylinder top 176. Guide tube 178 may be welded to cylinder tube 176 or otherwise attached. Slidably mounted within actuator guide tube 178 is a telescoping hollow push rod 182 which comprises a threaded insert 184 press fitted into its internal diameter at its inner end. A bearing sleeve 186 is welded to the exterior surface of push rod 182 at its inner end and slidably engages the inner diameter of guide tube 178. At its outer end, push rod 182 is welded to an end fitting 188 which comprises attachment lugs 156, 158 previously referred to. A similar pair of lugs are provided on the outer end of cylinder bottom 174. At the outer end of guide tube 178, a threaded retaining nut 190 is provided which houses on its inside diameter a wiper seal 192 engaging push rod 182. A further bearing member 193 is captured between retaining nut 190 and the end of actuator guide tube 178 to provide additional support for push rod 182 during operation. A lead screw 194 is positioned within push rod 182 and extends through threaded insert 184 in position to engage a piston assembly 196.

The piston assembly 196 is mounted for translation within the housing made of cylinder bottom 174 and cylinder top 176 and comprises a piston 198 which slides within a cylinder 200. A seal 202, such as a T-seal, and a wear ring 204 extend between piston 198 and cylinder 200 in the familiar manner. An inlet 206 for pressurized fluid such as air extends through the wall of cylinder bottom 174 into an interior volume 208 defined between piston 198 and cylinder bottom 174.

On the side of piston 198 facing into volume 208, a rightwardly opening, as illustrated, counter bore 210 is provided which has a radially inwardly extending annular bottom ledge 212 on which an annular clutch face insert 214 is seated. A further bore 216 opens from the inner diameter of bottom ledge 212 and extends leftwardly into a leftwardly opening counter bore 218 formed in piston 196 and extended leftwardly to an annular end surface 220 of piston 198. Counter bore 218 is closed, in part, by an annular piston head plate 222 having a central bore 224. A retaining ring 226 holds head plate 222 within counter bore 218.

Mounted within counter bores 210, 216 and 218 is an elongated, cylindrical clutch head assembly 228 which both rotates and translates within these bores. Assembly 228 is supported by means of a pair of bearings 230, 232 which are attached to the outer surface of head assembly 228 by suitable retaining rings and flanges, as illustrated. Thus, head assembly 228 rotates within bearings 230, 232 while bearings 230, 232 are allowed limited axial movement within bores 224 and 216. A counter bore 234 in the left end of head assembly 228 is secured to the end of lead screw 194 by an interference fit so that head assembly 228 rotates and translates with lead screw 194. Head assembly 228 also comprises at its right end a radially outwardly extending flange 236 having a leftwardly facing clutch face 238 positioned to engage the clutch face of insert 214, as shown in FIG. 7. Flange 236 also includes a rightwardly facing clutch face 240 positioned to engage a leftwardly facing clutch face 242 provided on the inside surface of a clutch lever mounting cap 244 which is threaded into counter bore 210, as illustrated.

Within clutch head assembly 228, a further bore 246 surrounds a clutch spring 248 which bears at one end on the piston end of lead screw 194 and is captured at its other end within the central bore of a hollow plunger 250. Surrounding plunger 250 is a threaded plunger adjustment sleeve 252 which is threaded into the right end of bore 246 and can be adjusted axially to limit the rightward movement of plunger 250.

Within clutch lever mounting cap 244, a central bore 256 slidably receives a plunger pin 258 which is movable axially within bore 256 under the influence of a clutch actuation lever 260 which is pivoted at 262a to the right surface of clutch lever mounting cap 244. In the position of the apparatus illustrated in FIG. 7, plunger pin 258 is pressed to its maximum into bore 256 so that spring 248 bears on the end of lead screw 194, thereby causing leftwardly facing clutch face 238 to firmly engage insert 214 and prevent rotation of lead screw 194.

Within counter bore 218 and between bearings 230, 232, a constant force, flat spiral spring 262, is positioned, the outer end of spring 262 being attached to piston 198 and the inner end of spring 262 being attached to clutch head assembly 228. A pair of telescope tubes 264 are welded or otherwise attached to head plate 222 and extend leftward so that the ends of cables 46, 48 are positioned within the telescope tubes. Means such as plugs 268 are swaged onto the ends of cables 46, 48 for sliding movement relative to telescope tubes 264. Plugs 268 are prevented from pulling out of telescope tubes 264 by means of retaining rings 270. Cables 46, 48 pass from cylinder top 176 through means such as ferrules 272 which are secured to the armored sheaths of the cables. A coil spring 274 biases piston 198 to the right, brakes-released position. At its right end, spring 274 is seated within an anti-rotation cup 276 slidably mounted within cylinder 200. Cup 276 is attached to head plate 222 by means of bolts 278. A pair of axially extending slots 280 are provided in cup 276 and similar slots 282 are provided in piston 198 in position to be engaged by anti-rotation screws 284. As a result, the piston assembly 196 is prevented from rotating in response to torque applied by spring 262.

As previously mentioned, FIG. 7 shows the actuator 38 is its released position. In this position, the clutch actuation lever 260 is fully depressed by the action of the release spring 274 and therefore forces the slack adjuster plunger 250 inward against the plunger spring 248, causing the entire plunger spring load to react on lead screw 194 and hold the clutch face 238 in engagement with clutch insert 214. Thus, lead screw 194 will not rotate under the influence of spiral spring 262 and whatever clearance exists between the brake shoes 28 and the associated wheels will be maintained. In this position, if a rail car inspector desires to increase the shoe clearance, he need only pry or "bar back" a brake shoe back so that a rightward force on push rod 178 eventually will overcome the preload of plunger spring 248, causing clutch face 238 to move out of engagement with clutch insert 214 and allowing lead screw 194 to rotate in such a direction to wind up spring 262. When the car inspector has obtained sufficient clearance and releases this prying action, the spring 248 will again force clutch face 238 against insert 214, preventing spring 262 from unwinding and taking up the slack just introduced. Thus, any amount of clearance required to change one or more brake shoes is available when the brake is released. On the other hand, should the car inspector exert excessive force on his pry bar, he will not be able to close the clearance between clutch faces 240 and 242 because rightward travel of lead screw 194 will stop against plunger adjustment sleeve 252 before clutch faces 240, 242 can engage.

When air is first admitted to the actuator through port 206, piston 198 moves to the left allowing the lever 260 to shift to the position shown in FIG. 8. As long as lever 260 continues to engage the inner surface of the brake cylinder, plunger 258 will apply force to spring 248 to urge lead screw 194 and clutch head assembly 228 to the left so that clutch face 238 remains engaged with clutch insert 214 and rotation of lead 194 is prevented. However, once movement of piston 198 permits lever 260 to move outwardly against its stop as illustrated in FIG. 9, spring 248 will no longer maintain engagement of the clutch. As a result, the spring 262 will begin to unwind itself and will rotate lead screw 194. Rotation of the lead screw will cause threaded insert 184 and its associated push rod 182 to move outward to the left, as illustrated, until contact between the brake shoes 28 and the adjacent wheels is achieved and an engagement force of, say, approximately 50 pounds has been attained. Since spring 262 drives the brake shoes through their clearance, the air consumption of the actuator is reduced. Further admission of air into the brake cylinder will force the piston further to the left. As the force exerted by the piston can only be transmitted to lead screw 194 through clutch faces 240,242, these clutch faces will engage, rotation of the lead screw 194 will be prevented and the force resulting from air pressure acting on piston 198 will be transmitted to the brake shoes, causing a brake application proportional to the brake cylinder pressure. The configuration of the apparatus at this stage is shown in FIG. 9. In a typical application, engagement of clutch faces 240,242 occurs after approximately 2 inches of actuator travel.

When air pressure is released from the actuator, spring 274 moves piston 198 to tne right, bringing lever 260 into contact with the cylinder head once again. At this point, the trigger is slightly depressed and urges clutch faces 240,242 apart to the position shown in FIG. 8. After a little more return stroke, clutch face 238 and insert 214 again engage. Note that when both the right and left clutch faces are separated, any clearance which might have resulted as a result of shoe wear can be taken up by the unwinding action of spring 262. Once piston 198 has traveled in the release direction to the position shown in FIG. 8, however, the left clutch faces will be engaged by spring 248 and the desired brake shoe clearance of, say, 2 inches will be assured.

If a new shoe is installed after the brakes have been released and the total brake shoe clearance is less than the desired amount of, say, 2 inches, the initial application of the brakes would result in the actuator plunger 250 stopping against its adjustment sleeve 252 before 2 inches of travel have occurred. Air pressure acting on the piston 198 would force it to the left against the now immovable push rod 182. As a result, force transmitted through lead screw 194 would cause clutch face 238 to move away from insert 214 and thereby permitting lead screw 194 to rotate and wind up the spring 262 until the desired amount of piston travel has been achieved. At this point, the clutch faces 240,242 would engage and prevent further let out of the lead screw.

It should be noted that if power spring 262 breaks, the slack adjuster operates as previously described except that it does not have the fast takeup feature. When air is admitted to the actuator port 206, the piston 198 moves and lever 260 pivots to disengage clutch face 238 and clutch insert 214. Since spring 262 is broken the rotation takes place only by the continued leftward movement of piston 198. Lead screw rotates in threaded insert 184 to move push rod 182 outward to the left. As the break shoe 28 engages the wheel and has a force of approximately 50 pounds, the force of spring 248 is overcome and clutch faces 240 and 242 engage preventing further rotation of the lead screw. Since the fast takeup did not occur, more than one braking cycle is needed to reach the desired brake shoe clearance.

When the air pressure is released and spring 274 returns the piston to the right, normal friction will prevent the beam from releasing immediately. Thus the initial movement of the piston relative to the push rod 182 causes disengagement of clutch faces 240 and 242 allowing lead screw 194 to rotate further adjusting the spacing. Once the beam begins to move, clutch face 238 and insert 214 engage preventing further rotation of lead screw 194.

Having described my invention in sufficient detail to enable those skilled in the art to make and use it, I claim and desire to secure Letters patent for:

1. In a brake rigging for a rail vehicle having at least one transverse axle; at least one brake beam extended in spaced, parallel relation to the axle and supported by the vehicle for movement longitudinally of the vehicle; a first pair of brake show carrying heads, one of said first pair mounted on each end of said brake beam, each of said first pair of brake shoe carrying heads comprising pivot means formed therewith; a pair of bell-crank levers each having a fulcrum and a pair of arms, one of said levers being mounted for rotation in each of said pivot means; and a fluid pressure operable brake actuator pivotably mounted at one end to one arm of one of said bell-crank levers and at the other end to one arm of the other of said bell-crank levers, the improvement comprising;

a pair of push rods each comprising at one end a clevis having a first axis of rotation, said clevis having arms with first bores spaced along said axis, a bearing member positioned between said arms, said bearing member having a concave spherical bearing surface with a center of curvature positioned on said axis, and means for retaining said bearing member between said clevis arms;

the other arm of each of said bell-crank levers having a convex spherical bearing surface and a second bore having a second axis extending through the center of curvature of said convex bearing surface;

bearing means extending into said second bore; and means extending through said first bore and said bearing means for pivotably coupling said push rods to said bell-crank levers with said spherical bearing surfaces in contact.

2. In a brake rigging according to claim 1, wherein the other end of each of said push rods is fixed relative to said transverse axle.

3. A brake rigging for a rail vehicle having at least one transverse axle; at least one brake beam extended in spaced parallel relation to the axle and supported by the vehicle for movement longitudinally of the vehicle; a first pair of brake shoe carrying heads, one of said first pair mounted on each end of said brake beam, each of said first pair of brake shoe carrying heads comprising pivot means formed therewith; and a pair of bell-crank levers each having a fulcrum and a pair of arms, one of said levers being mounted for rotation in each of said pivot means; the improvement comprising:

(a) a fluid pressure operable brake actuator pivotably mounted at one end to one arm of one said bell-crank levers and at the other end to one arm of the other of said bell-crank levers;

(b) a pair of push rods each comprising at one end a clevis having a first axis of rotation, said clevis having arms with first bores spaced along said axis, a bearing member positioned between said clevis arms, said bearing member having a concave spherical bearing surface with a center of curvature positioned on said axis, and means for retaining said bearing member between said clevis arms;

(c) the other arm of each of said bell-crank levers having a convex spherical bearing surface and a second bore having a second axis extending through the center of curvature of said convex bearing surface;

(d) bearing means extending into said second bore; and (e) means extending through said first bore and said bearing means for pivotably coupling said push rods to said bell-crank levers with said spherical bearing surfaces in contact.

4. A brake rigging according to claim 3 wherein the fluid operable brake actuator comprises:

(a) a housing containing a fluid operating piston;

(b) one end of the housing being pivotally connected to said one end of one arm of one of the bell-crank levers; and, (c) an actuating push rod connecting the piston to said other end of one arm of the other of the bell-crank levers.

5. A brake rigging according to claim 4 wherein the actuating push rod comprises a slack adjuster for adjusting the normal spacing of arms of the respective said one and said other bell-crank levers.

6. A brake rigging according to claim 5 wherein the slack adjuster includes an adjusting rod threaded through a nub secured to the actuating push rod and connected at one end through a friction clutch to the piston.

7. A brake rigging according to claim 6 wherein the slack adjuster comprises a torsional spring disposed at said one end of the actuating push rod, the torsional spring having one of its ends secured to the housing and the other of its ends secured to the adjusting rod for rotating and being rotated by the adjusting rod when the clutch is free to rotate relative to the piston.

8. A brake rigging according to claim 7 wherein cables are attached to the piston to facilitate manual application of brakes of the rigging.

* * * * *